US009532241B2

(12) United States Patent
Koskinen et al.

(10) Patent No.: US 9,532,241 B2
(45) Date of Patent: Dec. 27, 2016

(54) METHOD AND APPARATUS FOR MANAGING HANDOVER FAILURE

(75) Inventors: Jussi-Pekka Koskinen, Oulu (FI); Jarkko Koskela, Oulu (FI); Lars Dalsgaard, Oulu (FI); Ilkka Keskitalo, Oulu (FI); Mikko Uusitalo, Helsinki (FI); Martti Moisio, Haarajoki (FI); Juha S. Korhonen, Espoo (FI); Mauri Nissilä, Oulu (FI)

(73) Assignee: Nokia Technologies Oy, Espoo (FI)

( * ) Notice: Subject to any disclaimer, the term of this patent is extended or adjusted under 35 U.S.C. 154(b) by 117 days.

(21) Appl. No.: 14/349,343

(22) PCT Filed: Oct. 4, 2011

(86) PCT No.: PCT/FI2011/050857
§ 371 (c)(1),
(2), (4) Date: Jul. 14, 2014

(87) PCT Pub. No.: WO2013/050646
PCT Pub. Date: Apr. 11, 2013

(65) Prior Publication Data
US 2014/0362717 A1    Dec. 11, 2014

(51) Int. Cl.
*H04W 24/00*    (2009.01)
*H04W 24/02*    (2009.01)
(Continued)

(52) U.S. Cl.
CPC ......... *H04W 24/02* (2013.01); *H04W 36/0005* (2013.01); *H04W 36/08* (2013.01); *H04W 76/048* (2013.01); *H04W 84/005* (2013.01)

(58) Field of Classification Search
CPC ............ H04W 76/027; H04W 76/028; H04W 76/048; H04W 52/0216; H04W 56/00
(Continued)

(56) References Cited

U.S. PATENT DOCUMENTS 7,966,017 B2 *  6/2011  Kim ...................... H04W 36/08
                                                           370/328
2009/0323638 A1    12/2009  Catovic et al.
(Continued)

FOREIGN PATENT DOCUMENTS

EP         2136599 A1    12/2009

OTHER PUBLICATIONS

3rd Generation Partnership Project; Technical Specification Group Radio Access Network; . . . No. V10.1.0, Mar. 30, 2011 pp. 1-290, XP050476531, chapters 5.3.5.6 / 5.3.7.2 / 5.3.7.4.

*Primary Examiner* — Dang Ton
*Assistant Examiner* — Sai Aung
(74) *Attorney, Agent, or Firm* — Seppo Laine Oy

(57) ABSTRACT

In accordance with an example embodiment of the present invention, there is provided an apparatus comprising at least one processing core configured to determine a handover failure at the apparatus, the at least one processing core being further configured to compile information relating to the handover failure, the information comprising information on discontinuous reception, DRX, at the apparatus, the at least one processing core being further configured to cause a transmitter comprised in the apparatus to transmit the information relating to the handover failure toward a radio-access network. The information may be comprised in a handover failure report.

8 Claims, 4 Drawing Sheets

(51) Int. Cl.
  *H04W 36/08* (2009.01)
  *H04W 76/04* (2009.01)
  *H04W 36/00* (2009.01)
  *H04W 84/00* (2009.01)

(58) Field of Classification Search
  USPC ...... 370/328, 331, 216; 455/432.1, 436, 450
  See application file for complete search history.

(56) References Cited

U.S. PATENT DOCUMENTS

| | | | |
|---|---|---|---|
| 2010/0135159 A1* | 6/2010 | Chun | H04W 72/1289 370/241 |
| 2010/0165835 A1* | 7/2010 | Hsu | H04W 76/027 370/225 |
| 2010/0234037 A1* | 9/2010 | Terry | H04L 1/0023 455/450 |
| 2011/0002262 A1* | 1/2011 | Wang | H04L 1/1812 370/328 |
| 2011/0021154 A1* | 1/2011 | Marinier | H04W 72/02 455/67.11 |
| 2011/0194407 A1* | 8/2011 | Ji | H04B 7/2606 370/226 |
| 2011/0211458 A1* | 9/2011 | Ishii | H04W 76/028 370/242 |
| 2012/0063298 A1* | 3/2012 | Yi | H04W 56/00 370/216 |
| 2012/0307811 A1* | 12/2012 | Kwon | H04W 74/0833 370/336 |

* cited by examiner

METHOD AND APPARATUS FOR MANAGING HANDOVER FAILURE

TECHNICAL FIELD

The present application relates generally to managing handovers in cellular communications.

BACKGROUND

An example of wireless communication is cellular wireless communication performed in the context of a cellular communications network. Cellular communication networks may comprise a plurality of cells that mobiles may communicate with, sequentially or concurrently. Due to mobility, a mobile can change from a first situation where it communicates with a first cell to a second situation where it communicates with a second cell. Such a change may be called a handover.

Handovers comprise also so-called soft handovers, where a mobile begins communicating with a new cell without ceasing to communicate with a previous cell, and softer handovers where a mobile begins communicating with a new sector of a cell it is already in communication with, without ceasing communicating with a sector it already communicates with. Handovers may be triggered by measurements conducted in mobiles, wherein a mobile may detect that it is leaving the service area of a first cell and moving toward a service area of a second cell. When a mobile reports such measurements to a serving cell, the network the serving cell is comprised in may decide to handover the mobile to the second cell.

Smart phones have become prevalent as users desire more data-centric services when on the move. Smart phones may benefit from long times of continuous connection to the network. For example, where a smart phone is programmed to serve as an email client, a smart phone may be in more or less constant communication with an email server to discover arriving email messages. Another example is internet browsing, where a smart phone may keep up a connection open for a prolonged period of time, with intermittent data traffic as the user occasionally requests new web pages to be fetched.

Optimizing the behavior of smart phones aims, among other things, to minimize the power consumption for smart phones trying to keep open always-on type of connections when connected to cellular networks. Always-on connections without active service usage may carry "keep-alive" or status update messages intermittently. An assigned connection such as, for example, a radio resource connection, RRC, connection, may be maintained for long periods of time to prevent unnecessary state transitions between an idle mode and a connected mode between packet transmissions.

In order to minimize power consumption during prolonged periods of assigned connections, a mobile may be programmed to enter a discontinuous mode, wherein the mobile is able to reside partly in a low-power mode and only "wake-up" periodically to maintain the connection. In discontinuous mode a mobile may also be able to monitor for incoming data from the network, for example for a mobile-terminated call. One example of such a mode is a discontinuous reception, DRX, mode, where a mobile may monitor a control channel from a base station only intermittently, according to a time pattern known to both mobile and base station. When residing in a low-power phase in DRX mode, a mobile may have its radio receiver in an inactive mode to conserve energy.

SUMMARY

Various aspects of examples of the invention are set out in the claims.

According to a first aspect of the present invention, there is provided an apparatus comprising at least one processing core configured to determine a handover failure at the apparatus, the at least one processing core being further configured to compile information relating to the handover failure, the information comprising information on discontinuous reception at the apparatus, the at least one processing core being further configured to cause a transmitter comprised in the apparatus to transmit the information relating to the handover failure toward a radio-access network.

According to a second aspect of the present invention, there is provided an apparatus, comprising a receiver configured to receive to failure report from a mobile terminal, the failure report comprising information on discontinuous reception at the mobile terminal, the
at least one processing core being further configured to adjust at least one handover parameter in response to the failure report.

According to a third aspect of the present invention, there is provided an apparatus, comprising a memory configured to store movement information concerning a plurality of mobile terminals, at least one processing core configured to derive a motion pattern from the movement information, and the at least one processing core being further configured to use the motion pattern to predict at least one handover of at least one mobile terminal, and to facilitate the at least one handover based at least in part on the prediction and previously collected handover information.

The scope of the invention also comprises methods in apparatuses according to aspects of the invention, as well as computer programs and computer program products configured to cause methods comprised in the scope of the invention to be performed, when run on computers.

BRIEF DESCRIPTION OF THE DRAWINGS

For a more complete understanding of example embodiments of the present invention, reference is now made to the following descriptions taken in connection with the accompanying drawings in which.

DETAILED DESCRIPTION OF THE DRAWINGS

An example embodiment of the present invention and its potential advantages are understood by referring to FIGS. 1 through 4 of the drawings.

Figure 1:
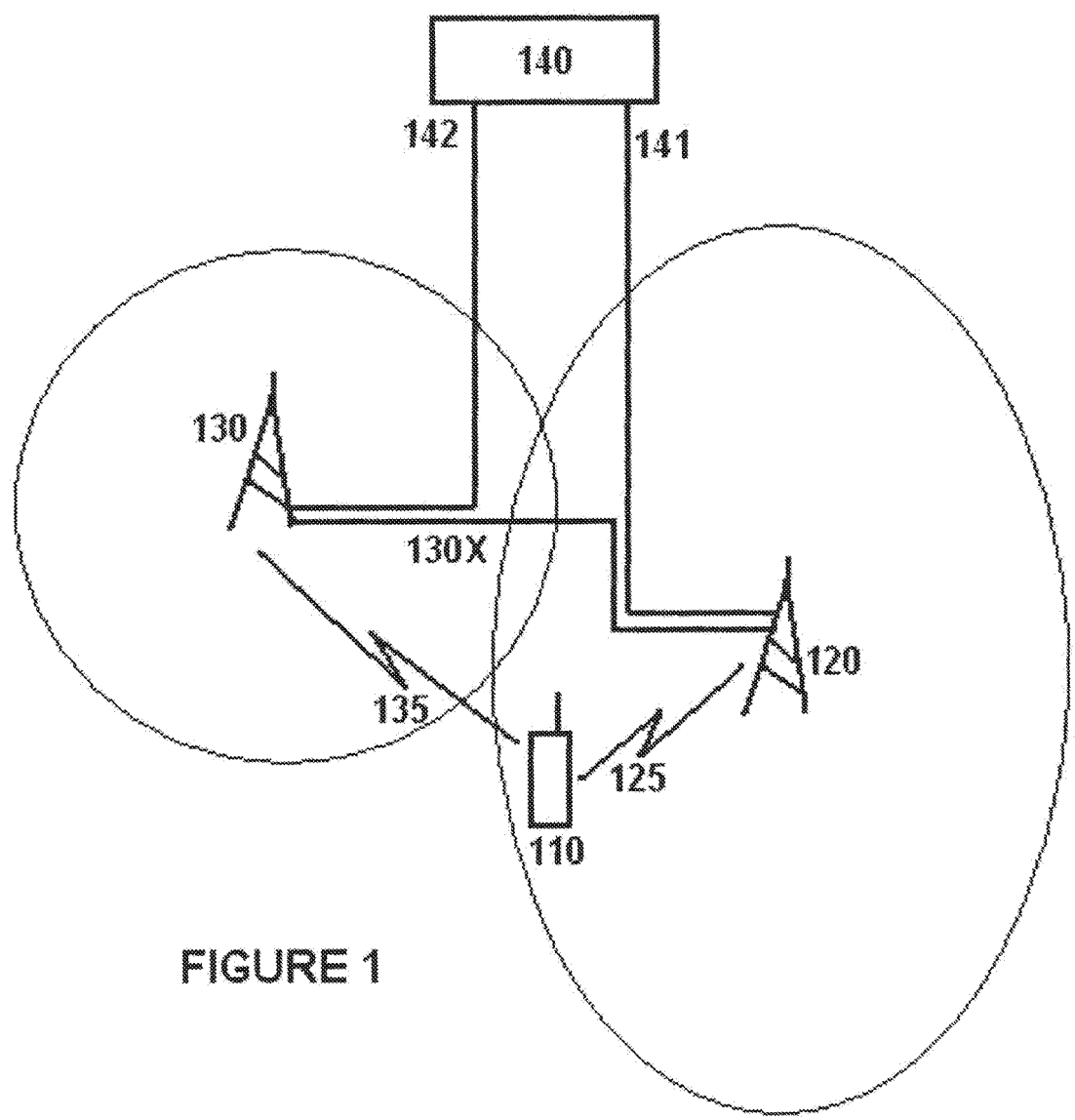
FIG. 1 illustrates an example of a system capable of supporting some embodiments of the invention.

FIG. 1 illustrates an example of a system, in this example a cellular system, capable of supporting some embodiments of the invention. Illustrated in FIG. 1 is mobile 110, which may be, for example, a smart phone, a tablet or laptop computer, cellular phone, personal digital assistant, machine-to-machine, M2M, automated device or an other, similar apparatus. Mobile 110 may be a user equipment, UE, in the sense of wideband code division multiple access, WCDMA, or long term evolution, LTE, standards produced by the third generation partnership project, 3GPP, for example.

FIG. 1 also illustrates base station 120 and base station 130. Base station 120 and base station 130 may be essentially similar, for example they may act as base stations in the same system. In some embodiments, base station 120 and base station 130 are base stations comprised in a WCDMA, or LTE cellular system. As a terminological point, a WCDMA base station may be known as a node-B. Similarly a LIE base station may be known as an eNB. Mobile 110 may be communicatively connected to base station 120 via wireless link 125. Wireless link 125 may operate in accordance with a defined standard, for example WCDMA or LTE, or where mobile 110 is capable of communicating with wireless local area network. WLAN access points wireless link 125 may operate in accordance with WLAN standards. Also other standards, all of which cannot be named here for the sake of conciseness, are possible. Wireless link 125 may comprise an uplink for conveying information from mobile 110 to base station 120. Wireless link 125 may comprise a downlink for conveying information from base station 120 to mobile 110. The uplink and/or downlink of wireless link 125 may operate in a time division multiple access, TDMA, frequency-division multiple access, FDMA, code-division multiple access, CDMA, orthogonal frequency division multiple access, OFDMA, manner or in a manner that is a combination of at least two of the foregoing.

Wireless link 135 connecting mobile 110 to base station 130 may be similar to wireless link 125, or alternatively it may be different. For example, where wireless link 125 operates according to WLAN and wireless link 135 operates according to LTE, the overall system comprising base station 120 and base station 130 is a multi-standard system supporting also inter-radio-access technology, inter-RAT, handovers.

Signaling connection 130X interconnects base station 120 and base station 130. Signaling connection 130X may be a wire-line connection, for example, or alternatively a wireless link, such as for example a directional microwave link. Using signaling connection 130X, base station 120 and base station 130 may exchange information to facilitate functioning of the cellular system, for example the base stations may exchange inter-base station handover signaling information to facilitate handing mobiles over from base station 120 to base station 130, and vice versa. In handover situations, the base stations may agree with each other using signaling connection 130X the terms and timing of a handover, and the target base station may promise a certain quality of service to a mobile handing over in order to offer it a similar connection in the target cell as it was offered in the source cell. The base stations may exchange status or load information with each other, for example base station 130 may inquire whether base station 120 is near its maximum capacity and base station 120 may responsively provide its load status to base station 130. In LTE systems, signaling connection 130X may be known as an X2-interface.

Base station 120 is connected to a network node 140 by means of signaling connection 141. Like signaling connection 130X, signaling connection 140 may be wire-line or wireless. Signaling connection 141 may be used by the cellular system to manage base station 120, for example by providing access to authorization functions for authorizing mobiles 110 that are switched in within a cell controlled by base station 120 for access to the cellular system. Signaling connection 141 may be used to assign frequency and/or code resources to a cell controlled by base station 120. Signaling connection 141 may be used to update software controlling the functioning of base station 120. Signaling connection 141 may also be used to provide access to further networks, such as the Internet, to mobiles attached to base station 120.

With respect to base station 130, signaling connection 142 may be substantially similar to signaling connection 141 with respect to base station 120.

Network node 140 may be, depending on the embodiment, a radio-access network controller or a core network node. In a WCDMA embodiment, for example, network node 140 may be a radio network controller, RNC. In a LTE embodiment, network node 140 may be a mobility management entity, MME or a serving gateway. SGW, for example, Network node 140 may be connected to further nodes, such as core network nodes, by signaling connections that are not illustrated in FIG. 1. In general a core network may comprise nodes that control the functioning of a cellular system on a system-wide level. These nodes may include switches, authorization servers, subscriber databases, transcoding nodes and gateway nodes providing access to further networks.

When mobile 110 moves, or roams, in a cell controlled by base station 120 toward a cell controlled by base station 130, mobile 110 may observe in measurements it conducts that a signal strength of a beacon channel, such as for example a synchronization channel or common reference symbols, transmitted by base station 120 declines, while that of a beacon channel transmitted by base station 130 increases. Mobile 110 may be configured to transmit measurement reports to the system, or mobile 110 may be configured to determine autonomously that a handover is needed. Where mobile 110 is configured to transmit measurement reports to the system, mobile 110 may transmit the measurement reports to base station 120. Base station 120 may responsively either decide to negotiate with base station 130 concerning initiating the handover, or alternatively base station 120 may forward the reports to network node 140 for actions relating to handover. Where mobile 110 is configured to determine autonomously that a handover is needed, mobile 110 may be configured to transmit handover requests to at least one of base station 120 and base station 130.

A successful handover occurs when mobile 110 is switched from a cell controlled by base station 120 to a cell controlled by base station 130 around the time mobile 110 roams over the geographical boundary between the two cells. In this example the cell of base station 120 is the source cell and the cell of base station 130 is the target cell. A defective handover occurs where mobile 110 is switched too late, for example, and proceeds into the cell controlled by base station 130 before being handed over. The handover may become defective in this case since communications with base station 120 may fail before new communications are established with base station 130, creating a discontinuity in service to mobile 110.

When mobile 110 experiences a defective handover, it may be configured to attempt to maintain itself in a connected mode without transitioning to an idle mode while it attempts to re-establish connectivity. When communications are re-established to a base station storing a context of mobile 110, for example, mobile 110 may continue communications following the re-establishment with relatively little impact on user experience. On the other hand, where mobile 110 isn't successful in re-establishing connectivity to a base station storing a context of mobile 110, mobile 110 may need re-authentication, RRC connection establishment and other procedures which all create delay before mobile 110 is once more ready for communication in an active mode. In some embodiments, re-establishment requires that a context of mobile 110 is present, whereas in other embodiments re-establishment may succeed also without the context of mobile 110 being present.

A context of mobile 110, which may be known as a UE context, may comprise information allowing a base station to serve mobile 110. The information may comprise information on active sessions and bearers, bearer quality-of-service characteristics, roaming history, UE capabilities and charging assistance data. Overall, receiving a context for mobile 110 from a source base station allows a target base station to continue serving mobile 110 in a way that causes minimal disturbance from handover since sessions and bearers don't need to be re-negotiated in the target cell.

When mobile 110 is configured to discontinuous reception, DRX, handover mechanisms may be affected. In DRX mode, a transceiver of mobile 110 may be essentially switched on and off according to the DRX pattern. For example, where the downlink of wireless link 125 is based at least in part on TDMA, the DRX pattern may be that the receiver is on for 1 frame, followed by 15 frames of inactivity, i.e., the receiver is switched off for 15 frames. Alternatively, the DRX pattern may be that the receiver is essentially off for every second timeslot or may be off even far hundreds of milliseconds or even seconds. Since the receiver of mobile 110 in a DRX mode is switched on for a minimum of pre-defined periods according to the DRX pattern, and may be switched off outside these periods, if not scheduled, mobile 110 may not perform the same measurements with respect to base station 120 and base station 130 as in non-DRX, or continuous-reception, mode. For example, the mobile configured to DRX mode may not perform measurements at the same frequency.

In detail, mobile 110 may either send measurement reports containing less data or mobile 110 may send measurement reports containing the correct amount of data but the reports may be sent later than in continuous mode due to delay in performing measurements. Where the DRX pattern dictates that the receiver of mobile 110 is active one tenth of the time and a measurement used for mobility is averaged over time in order to get more stable measurements and robust mobility, there are thus two options. One is to measure in as continuous manner when DRX is applied, for example in 10 continuous timeslots as if DRX was not used, reporting the signal strength of the measurement result. Another option is to perform measurements according to when UE is awake according to the DRX pattern, collect the specified amount of measurement data, which with this example DRX pattern would take 100 slots of time. In the first option, the measurement result contains less data and is thus a noisier result compared to a continuous non-DRX measurement result and in the latter option, compiling the measurement report takes much longer than in a non-DRX measurement. An inaccurate measurement can trigger unnecessary handovers, or leave necessary ones un-triggered. A late measurement report may result in a defective handover where mobile 110 roams deep into the target cell before the handover is triggered in the cellular system.

In order to mitigate these problems, the network may attempt to set handover parameters to minimize defective or failed handovers. For example, following a failed handover or other connection failure the cellular system may request a failure report from mobile 110. Responsively, mobile 110 may provide the requested report, which may comprise, for example, one or a few most recent measurement results and optionally also their associated timing information. The report may identify, for example, which beacon transmissions were detected in the measurements, the strengths and/or qualities measured, at least one cell identity, and/or the times the measurements were performed may be either explicitly or implicitly indicated. Explicit indication may comprise a timestamp and implicit indication may comprise a time differential to an earlier measurement. Responsive to receiving the failure report, the cellular system may adjust handover parameters to reduce the occurrence rate of failed handovers. For example, the system may adjust a time to trigger, TTT, parameter that governs the time duration how long the signal conditions for the HO event should be valid before handover processing, for example, measurement reporting, is triggered. If the system determines that many handovers occur too late, the TTT parameter may be reduced to cause handovers to occur sooner. Another handover parameter that may be modified is a handover offset, which indicates the reference signal received power, RSRP, level difference between serving and target cells when the given event is fulfilled and the TTT timer is started, and can be used to govern when handovers are caused to occur, TTT and HO offset, both separately and together, provide a hysteresis effect wherein the likelihood of a mobile returning to the source cell can be controlled and unnecessary back-and-forth handover traffic can be reduced. Handover parameters may be adjusted on a per mobile or per cell basis, per carrier, or on a larger basis such as per tracking area, which consists of several cells, or even on a system-wide basis.

Where mobile 110 is in DRX mode, failure reports it sends may comprise DRX information, which may comprise, for example, at least one of information on the DRX pattern in use and the phase of the pattern that mobile 110 was in when the failed handover occurred. Alternatively, mobile 110 may inform directly the time elapsed from the last measurement and an averaging time used for the measurements. In some embodiments, the direct information may be more appropriate where mobile 110 is allowed but not forced to sleep according to the DRX pattern. The cellular system may use the DRX information when deciding how to use the failure reports in setting handover parameters. For example, where a failed handover occurred in a case where the DRX phase information indicates that a long time had elapsed since the last time the receiver of mobile 110 was active, it may decide to discard the failure report or to use it with a lower weight. The reported failures may be given a certain weight which may be proportional to the impact of the DRX situation to the experienced failure.

Further, the optimization function may apply various kinds of more sophisticated filtering to the failure reports based on the DRX information. The filters may be functions; discarding the reports being the most simple example for non-linear operation. Alternatively or additionally, the optimization function may utilize the timing information about the measurement time instant which may be either explicitly or implicitly reported. Timing information can provide the most exact information about the phase where the measurements were conducted with respect to the failure situation. The timing information can be relative, such as time differences, or absolute when a common time reference is available. The timing information may be used as one of the inputs for filtering of the failure reports and determining how strong a contribution each report may have to the mobility parameter optimization function. In contrast, where the DRX phase information indicates that the receiver of mobile 110 was active during the failed handover and/or immediately prior to it, the cellular system may use the failure report in the same manner as it uses failure reports that don't indicate presence of DRX. In the cellular system, the failure reports may be handled, and handover parameters caused to be modified, in base stations or other nodes, such as for example in network node 140 in FIG. 1.

Another method to alleviate challenges in handover which may be caused by DRX configuration is to analyze patterns of collective movement of mobiles, such as mobile 110. For example in a case where a road traverses at least part of a cell controlled by base station 120, for example, base station 120 or another network node may observe over time that mobiles 110 travel along a certain path in the cell, the path being defined by the road. Although base station 120 may not directly observe the road, base station 120 may observe from positioning information relating to mobiles 110 in the cell that there exist correlations between mobile movement and subsequent handovers. Base station 120 may obtain positioning information relating to mobiles 110 from reports sent by the mobiles, where mobiles may position themselves using satellite positioning, for example, or alternatively base station 120 may derive positioning information by triangulating, for example in co-operation with base station 130 using signaling connection 130X.

Using positioning information from more than one mobile 110, base station 120 may determine that there lies a path within the cell it controls that mobiles 110 tend to follow. In detail, the path may include turns such that mobiles headed momentarily toward a first cell will nonetheless for the most part handover to a second cell, when the underlying road takes a turn toward the second cell. In this sense handovers can be predicted with more accuracy than simply using a momentary motion vector of a single mobile. Base station 120 may use information on the path to predict handovers for individual mobiles 110, such that even when the mobiles are in DRX mode the handover may be triggered at an appropriate time despite possibly having lower-quality or less measurement data. In other words base station 120 may use historical information on paths taken by earlier mobiles 110 to predict a handover of a single mobile 110, together with positioning and/or measurement information relating to the single mobile 110.

As an example, base station 120 may determine that based on historical data, a mobile 110 that is located approximately in position A within the cell controlled by base station 120, and the motion vector of which is approximately V, is likely to undergo handover to a certain target cell time T later. It should be noted, that vector V doesn't necessarily point geographically toward the target cell. In a second example, base station 120 may determine that the position-velocity combination of approximately (A1, V1) followed 5 seconds later by the position-velocity combination of approximately (A2, V2) is associated with handover to a certain cell 10 seconds after the latter position. In a third example, base station 120 may determine based in (A1, V1) a first time estimate of handover, and based on (A2, V2) a second time estimate for handover, and cause the handover to occur at least in part at substantially the average of the first and the second time estimates. The invention naturally isn't limited to using one or two position-velocity pairs but extends to any feasible number. In some embodiments, base station 120 will only attempt to compile paths from data where the velocity exceeds a certain value. This may be useful where the cell contains a large road with fast-moving, cars, or a train track, and also smaller roads where routes of mobiles 110 are less predictable than on the larger road.

As an alternative, base station 120 may determine that a group of mobiles 110 is traveling together in the cell controlled by base station 120. This may correspond to a situation where a group of mobile subscribers travels on a bus or train, carrying their mobiles 110 with them. In this case the group of mobiles 110 together may produce a usable amount of measurement data to determine a proper time to handover the whole group, despite measurement data from individual mobiles 110 comprised in the group possibly remaining unsatisfactory when viewed in isolation of each other. In other words base station 120 may correlate the group of mobiles 110 together, and treat measurement data originating from mobiles 110 comprised in the group as collective group measurement data. When the collective group measurement data fulfills handover criteria, base station 120 may be configured to cause all mobiles 110 comprised in the group to undergo handover to the same target cell. The handover criteria base station 120 uses to determine when to handover the group may be optimized differently from handover criteria base station 120 uses for handing over a genuinely single mobile 110, in detail the handover parameters for group measurement data may be different from handover parameters for single mobiles.

Motion of a group of mobiles 110 together, and path information, may be collectively known as motion patterns. Base station 120 may be configured to use both kinds of motion patterns together, where base station 120 determines that a group of mobiles 110 is moving together as a group along a path that base station 120 has determined based on historical positioning information of earlier mobiles 110 that have roamed in the cell. In this case, base station 120 may use measurement data from the mobiles 110 comprised in the group together as collective group measurement data, with parameters of the path to determine a suitable time for handing over the group of mobiles 110 to the same target cell.

In general, a first apparatus such as, for example, mobile 110 or an integrated chip, may comprise at least one processing core configured to determine a handover failure. The determining may be based on determining that a handover process was begun, but connectivity to the target cell wasn't successfully established before a handover timer expired. Responsive to the determination of handover failure, the at least one processing core may be configured to compile information related to the handover failure, for example for a handover failure report, the information comprising information on a DRX mode. The DRX mode may be a current DRX mode the first apparatus works with at the time the determining occurs, in other words the at least one processing core may be configured to include information of a DRX mode in use at the time. The first apparatus may be configured to send the failure report, or cause it to be sent, toward a radio-access network, wherein the radio-access network may comprise base stations such as base station 120 and base station 130.

In some embodiments, the first apparatus is configured to send the failure report responsive to a successful connection re-establishment. In some embodiments, the first apparatus is configured to not send the failure report unless connection is successfully re-established. In other embodiments the report is sent at any point when requested by the network. Connection reestablishment in this context means that the first apparatus succeeds in restoring connectivity while remaining in a connected mode, without transitioning to an idle mode. The first apparatus may be constrained to transition to an idle mode unless connectivity is restored before a certain time period elapses since last successful communication with the source cell. In some embodiments, re-establishment can only succeed to a base station storing an appropriate context.

In some embodiments, the information on as DRX mode comprises information of the phase of a DRX pattern and/or phase which was active when a failed handover occurred.

In general, a second apparatus such as, for example, base station 120, base station 130 or a module for inclusion in a base station, comprises a receiver configured to receive a failure report from a mobile terminal, such as for example mobile 110, the failure report comprising information on discontinuous reception, DRX, at the mobile terminal. The second apparatus comprises at least one processing core configured to adjust at least one handover parameter and/or one or more DRX parameters in response to the failure report. The adjusted at least one handover parameter may relate to a specific mobile, a specific cell, a group of cells or the entire system. Adjusting the at least one handover parameter may comprise communicating with base stations via signaling connections such as signaling connection 130X.

The information on discontinuous reception at the mobile terminal may comprise information of a phase of a DRX pattern that the mobile was in at the time of the handover failure that the failure report relates to. Alternatively or in addition, the information on discontinuous reception may comprise at least one of discontinuous cycle length information, an inactivity timer length, whether the mobile terminal had scheduled transmissions when the handover failure occurred and time since last scheduling occurrence.

Where the information on discontinuous reception at the mobile terminal comprises information of phase, adjusting the at least one handover parameter may comprise ignoring a failure report where discontinuous reception played a part in the corresponding failure. Whether discontinuous reception, played a part may be determined by determining the length of time between the handover failure and the last time the receiver of the mobile was active. When the phase indicates that a time longer than a threshold time had elapsed since the receiver was active, the failure report may be ignored in the sense that no handover parameters are caused to be adjusted based at least in part on it.

Alternatively, adjusting the at least one handover parameter may comprise applying a weight to the importance of the failure report where discontinuous reception played a part in the corresponding failure, or filtering failure reports where discontinuous reception played a part in the corresponding failure.

Using a weight may comprise assigning a larger weight to reports where DRX played a lesser part and a lower weight to reports where DRX played a larger part, wherein DRX is considered to have played a larger part when the time that had elapsed between the last time the mobile's receiver was active and the failed handover was longer. Correspondingly. DRX is considered to have played a lesser part when the elapsed time was shorter. Filtering may comprise filtering reports based on the mobile that sent them, in the sense that reports from a certain mobile are only used to modify at least one parameter that relates to that mobile. In this sense a network node may be involved to manage the at least one parameter. Examples of such network nodes include base stations, radio network controllers and mobility management entities. Filtering may optionally utilize reported or otherwise determined information about the time instants, either relative or absolute, of the measurements that were included in the failure report. The time information may be part of the weighting function to determine how much each report will affect the to the mobility parameter optimization. Further, the weighting or filtering process may take also other information into account that is available for the optimization function which may reside in the network side, or be measured by the radio-access network. Such information could be, for example, a load situation either in the source or target cell, uplink measurement results measured by the serving cell before the failure situation, uplink measurement results by the target cell when (re-)establishing the connection, or the like.

Alternatively, filtering may comprise that statistics on handover failures are collected for optimizing handover parameters separately for different DRX cycles instead of relying on only a set of parameters that while stations apply irrespective of their DRX states. The relationship of the configured TTT and the DRX cycle can be assessed. For example, if the TTT is longer than the DRX cycle, the measurements can be averaged and the reliability of the mobility trigger will be better. In contrast, when the DRX cycle is longer than TTT, the mobility may be based on a single measurement result only. The inaccuracy of the measurement could in such a case affect mobility performance.

In some embodiments, the at least one handover parameter to be adjusted comprises a time to trigger, TTT, parameter.

In general, a third apparatus such as for example, a base station or a module for inclusion in a base station, comprises a memory configured to store movement information relating to a plurality of mobile terminals, such as mobile 110. The third apparatus further comprises at least one processing core configured to derive a motion pattern from the movement information. The movement information may comprise, for example, position and velocity information or information on agreeing velocity among a group of mobiles, wherein mobiles are determined to have substantially the same velocity vector. Deriving a motion pattern from movement information may comprise, for example, deriving position-velocity pair and associated handover information from movement and velocity information, and information on subsequent handovers. The at least one processing core is further configured to use the motion pattern to predict and facilitate at least one handover of at least one mobile terminal. Facilitating at least one handover may comprise using the motion pattern to determine, at least in part, a time for causing the handover to be triggered. The at least one mobile the at least one handover is facilitated for may be comprised in the plurality of mobile terminals, or alternatively not be comprised therein.

In some embodiments, the motion pattern comprises as pattern where a group of mobile terminals is determined to be moving together as a group. In some embodiments, the motion pattern comprises a path information on a path that is determined to exist in a cell, wherein mobiles are observed to follow the path when roaming in the cell and to undergo handover substantially at an endpoint of the path in the cell.

In some embodiments, the third apparatus is configured to compile path information only from movement information where velocity exceeds a threshold value. In this way slowly moving mobiles, which may be on small roads where movement directions are unpredictable, are eliminated from path information to yield more coherent path information.

In some embodiments, mobiles record and save handover related information, such as for example alternative signal levels when approaching potential handovers and parameters recording details of the handover and how well it worked. This additional connectivity information can be communicated to the network and used when facilitating the handovers of future devices facing the similar handover. The network may use the additional connectivity information along with other previously collected handover information.

Figure 3:
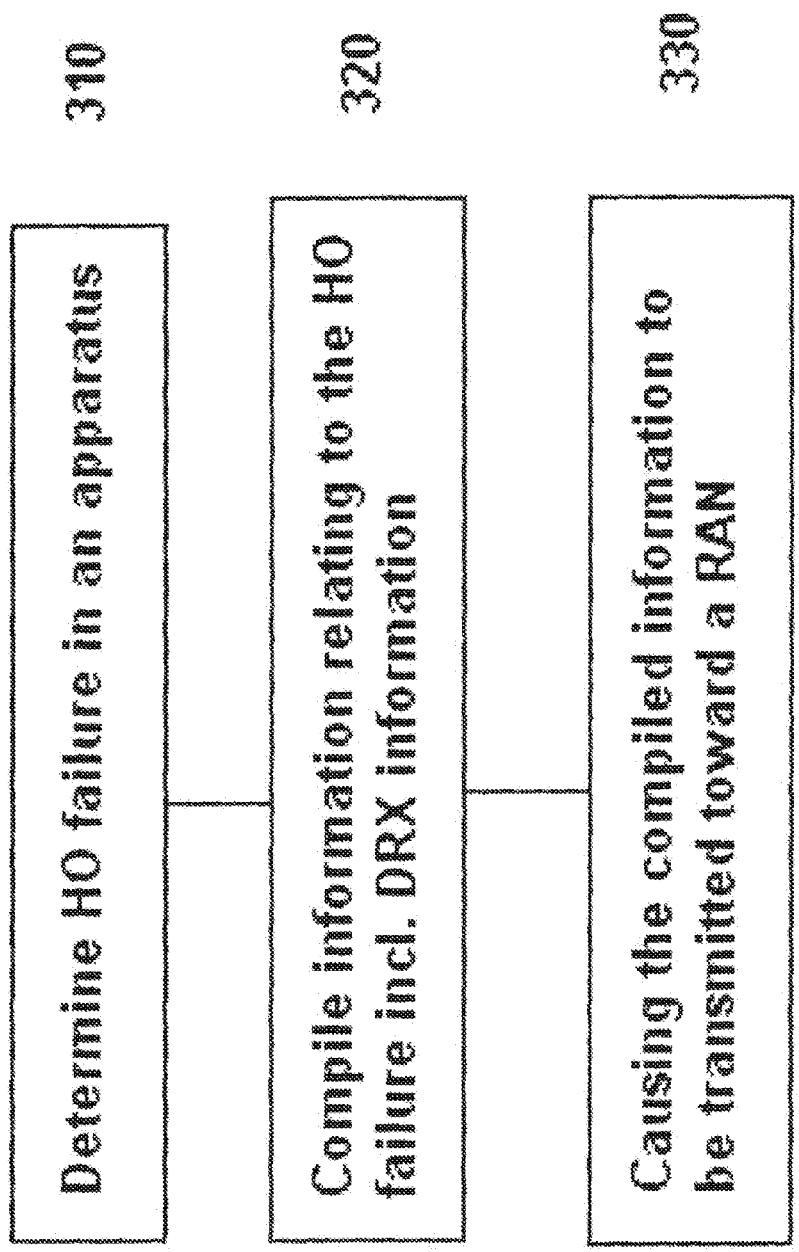
FIG. 3 is a flowchart of a method according to an embodiment of the present invention.

FIG. 3 is a flowchart of a method according to an embodiment of the present invention. In phase 310, it is determined that a handover, HO, failure has occurred. The determining may take place, for example, in a mobile device such as mobile 110, or in a subassembly of such a mobile device. Examples of subassemblies include a processor, a processing core, a chipset and the like. In phase 320, information on the HO failure is compiled, wherein the information comprises information on discontinuous reception DRX. In phase 330 the compiled information is caused to be transmitted toward a radio access network, RAN. Causing to be transmitted may comprise triggering, by a processing core or chipset in mobile 110, a transmitter comprised in mobile 110 to transmit a signaling message to a base station. In some embodiments, mobile 110 or a subassembly thereof is configured to send a report responsive to a request for a report from base station 120 or base station 130. In these embodiments, the sending is not responsive to successful re-establishment but responsive to the request.

Figure 4B:
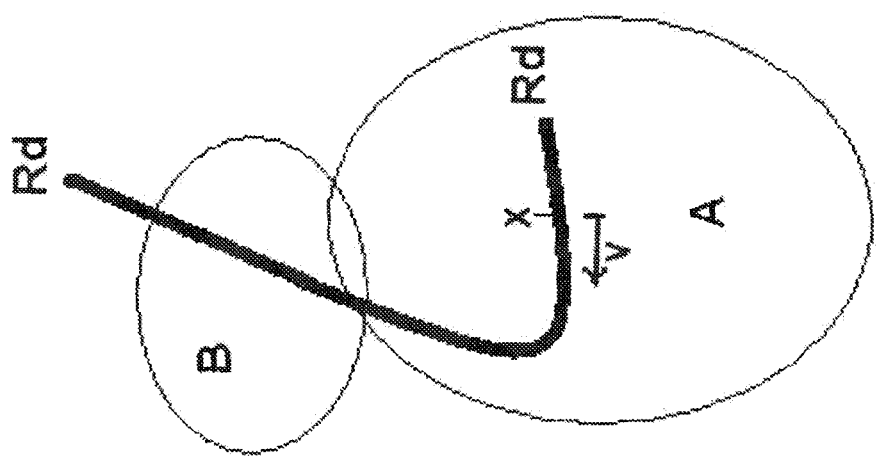
FIG. 4 illustrates two embodiments where motion patterns are used to facilitate handover.
Figure 4A:
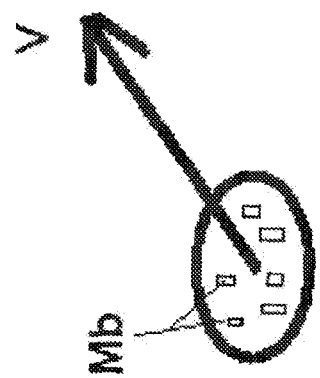

FIG. 4 illustrates two embodiments where motion patterns are used to facilitate handover. FIG. 4a illustrates two cells, A and B. Road Rd traverses both cells. A base station controlling cell A may determine that in position x within cell A, mobiles tend to be moving at about a velocity represented by velocity vector v, which corresponds to driving along road Rd. The base station may be able to correlate a finding that a position x and velocity v precede a handover to cell B by a certain time, for example 45 second. Thereafter, the base station may predict handovers of mobiles that roam at a velocity represented by velocity vector v at point x, namely that those mobiles are likely to handover to cell B after about 45 seconds. The base station may be able also to determine, that if the velocity is slightly higher, then the handover tends to occur correspondingly slightly sooner and vice versa. With an increasing sample of observations, the base station may be able to substantially construct the path of road Rd, and calculate based on the absolute value of v and the path an estimate time for handover to cell B. For example, where a base station of cell A determines that a mobile is moving along the path with a velocity vector the absolute value of which is 55 km/h=15.3 m/s and there remain, measured along the path, 350 meters to the boundary between cells A and B, the handover should occur in about 350 m/(15.3 m/s)=22.9 seconds. The estimate may be updated as the time draws nearer if new movement information concerning the mobile becomes available.

FIG. 4b illustrates another example of motion patterns. In FIG. 4 there are illustrated a plurality of mobiles Mb such as, for example mobile 110. In this case a base station controlling the cell may determine that the velocity vectors of the mobiles Mb are essentially the same, whereupon the base station may determine that the mobiles Mb are moving together as a group. When deciding that the mobiles are moving together as a group, the base station may also be configured to use position information, wherein the mobiles cannot be considered to be moving together as a group if they are too far apart from each other. A benefit of this is that distant mobiles aren't considered to be a group due to accidentally agreeing velocity vectors. An incorrect grouping might cause an unnecessary handover to be triggered for at least one group member. The base station may be configured to use this information to determine a common handover time for the mobiles Mb to a target cell. The base station may be configured to consider the group of mobiles to be traveling along a path as in FIG. 4a, where this is appropriate.

Figure 2:
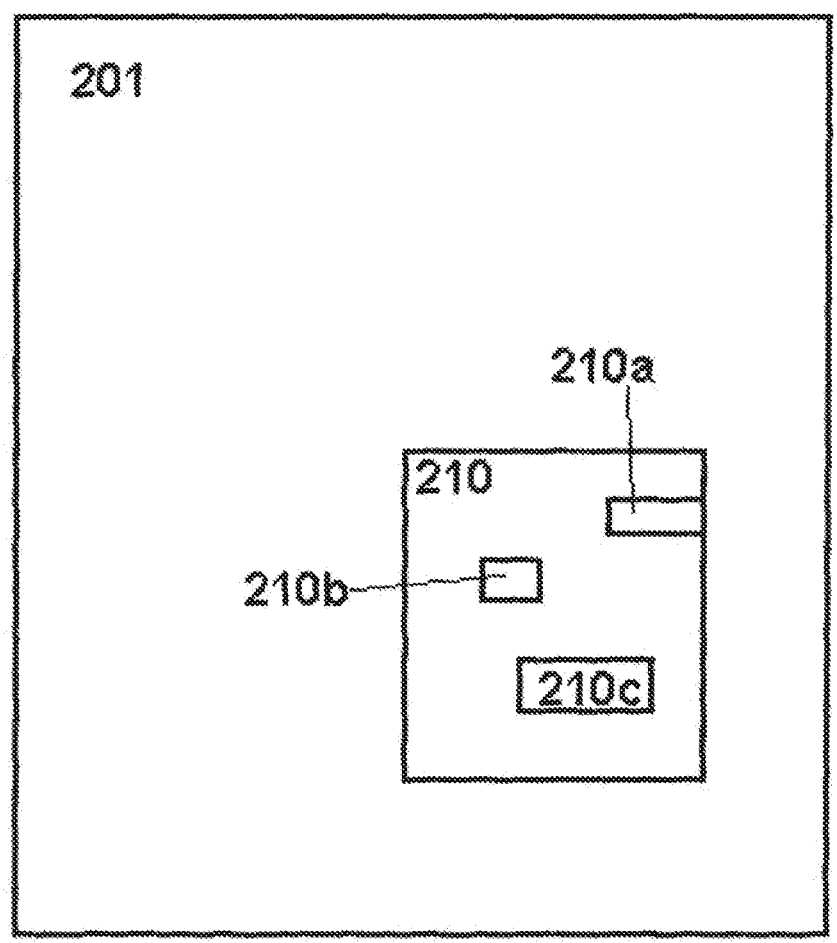
FIG. 2 illustrates an example apparatus capable of supporting embodiments of the present invention.

FIG. 2 illustrates an example apparatus 201 capable of supporting embodiments of the present invention. The apparatus may correspond to mobile 110, or base station 120, for example. The apparatus is a physically tangible object, for example a mobile telephone, personal digital assistant, data dongle or a similar device. The apparatus may comprise a control apparatus 210, for example a digital signal processor, DSP, processor, field-programmable gate array, FPGA, application-specific integrated circuit, ASIC, chipset or controller. The apparatus may further comprise a transmitter and/or a receiver 210a configured to enable the apparatus 201 to connect to other apparatuses. A combination of transmitter and receiver may be called a transceiver. The apparatus may comprise memory 210b configured to store information, for example DRX information. The memory may be solid-state memory, dynamic random access memory, DRAM, magnetic, holographic or other kind of memory. The apparatus may comprise logic circuitry 210c configured to access the memory 210b and control the transmitter and/or a receiver 210a. The logic circuitry 210c may be implemented as software, hardware or a combination of software and hardware. The logic circuitry may comprise at least one processing core. The logic circuitry 210c may execute program code stored in memory 210b to control the functioning of the apparatus 201 and cause it to perform functions related to embodiments of the invention. The logic circuitry 210c may be configured to initiate functions in the apparatus 201, for example the sending of data units via the transmitter and/or a receiver 210a. The logic circuitry 210c may be control circuitry. The transmitter and/or a receiver 210a, memory 210b and/or logic circuitry 210c may comprise hardware and/or software elements comprised in the control apparatus 210. Memory 210b may be comprised in the control apparatus 210, be external to it or be both external and internal to the control apparatus 210 such that the memory is split to an external part and an internal part. If the apparatus 201 does not comprise a control apparatus 210 the transmitter and/or a receiver 210a, memory 210b and logic circuitry 210c may be comprised in the apparatus as hardware elements such as integrated circuits or other electronic components. The same applies if the apparatus 201 does comprise a control apparatus 210 but some, or all, of the transmitter and/or a receiver 210a, memory 210b and logic circuitry 210c are not comprised in the control apparatus 210. In embodiments where apparatus 201 is a mobile user equipment, apparatus 201 may comprise at least one antenna.

Without in any way limiting the scope, interpretation, or application of the claims appearing below, a technical effect of one or more of the example embodiments disclosed herein is that handover success rates are increased. Another technical effect of one or more of the example embodiments disclosed herein is that unnecessary handovers may be avoided. Another technical effect of one or more of the example embodiments disclosed herein is that handover timing accuracy is improved for DRX mobiles.

Embodiments of the present invention may be implemented in software, hardware, application logic or a combination of software, hardware and application logic. The software, application logic and/or hardware may reside on memory 210b, the control apparatus 210 or electronic components, for example. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted in FIG. 2. A computer-readable medium may comprise a computer-readable non-transitory storage medium that may be any media or means that can contain or store the instructions for use by or in connection with an instruction execution system, apparatus, or device, such as a computer. The scope of the invention comprises computer programs configured to cause methods according to embodiments of the invention to be performed.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

What is claimed is:

1. An apparatus, comprising:
at least one processing core configured to determine a handover failure at the apparatus;
the at least one processing core being further configured to compile information relating to the handover failure, the information comprising information on discontinuous reception at the apparatus;
the at least one processing core being further configured to cause a transmitter comprised in the apparatus to transmit the information relating to the handover failure toward a radio-access network,
wherein the information on discontinuous reception at the apparatus comprises at least one of information of a phase of a discontinuous reception pattern the apparatus was in when the handover failure occurred and information of a time instant when a signal strength measurement was performed in the apparatus, wherein the apparatus further comprises a memory configured to store the information on discontinuous reception and
wherein the at least one processing core is configured to cause the information relating to the handover failure to be transmitted responsive to at least one of successful connection re-establishment following the handover failure and a request received from the radio-access network, wherein successful connection re-establishment comprises that the apparatus is continuously in a connected mode.

2. An apparatus, comprising:
a receiver configured to receive a failure report from a mobile terminal, the failure report comprising information on discontinuous reception at the mobile terminal;
at least one processing core configured to use the information on discontinuous reception when adjusting at least one handover parameter in response to the failure report,
wherein the information on discontinuous reception at the mobile terminal comprises at least one of information of a phase of a discontinuous reception pattern the mobile terminal was in when a handover failure occurred and information of a time instant when a signal strength measurement was performed in the mobile terminal and
wherein adjusting at least one handover parameter in response to the failure report comprises at least one of: ignoring a failure report where discontinuous reception played a part in the corresponding failure, using a weight for the importance of the failure report where discontinuous reception played a part in the corresponding failure and filtering failure reports where discontinous reception played a part in the corresponding failure.

3. The apparatus according to claim 2, wherein the information on discontinuous reception at the mobile terminal comprises at least one of discontinuous reception pattern, an inactivity timer length and whether the mobile terminal had scheduled transmissions when the handover failure occurred.

4. The apparatus according to claim 1, wherein the weight or filtering of the handover failure report is determined by at least one of utilizing the timing information included in the failure report and utilizing the information available in the radio access network or measured by the radio-access network nodes.

5. The apparatus according to claim 2, wherein the at least one handover parameter comprises a time to trigger, TTT, parameter.

6. A method, comprising:
determining a handover failure at an apparatus;
compiling information relating to the handover failure, the information comprising information on discontinuous reception at the apparatus;
causing transmitting of the information relating to the handover failure toward a radio-access network,
wherein the information on discontinuous reception at the apparatus comprises at least one of information of a phase of a discontinuous reception pattern the apparatus was in when the handover failure occurred and information of a time instant when a signal strength measurement was performed in the apparatus and
wherein the information relating to the handover failure is caused to be transmitted responsive to at least one of successful connection re-establishment following the handover failure and a request received from the radio-access network, wherein successful connection re-establishment comprises that the apparatus is continuously in a connected mode.

7. A method, comprising:
receiving a failure report from a mobile terminal, the failure report comprising information on discontinuous reception at the mobile terminal;
adjusting, based on the information on discontinuous reception, at least one handover parameter in response to the failure report,
wherein the information on discontinuous reception at the mobile terminal comprises at least one of information of a phase of a discontinuous reception pattern the mobile terminal was in when a handover failure occurred and information of a time instant when a signal strength measurement was performed in the mobile terminal and
wherein adjusting, based on the information on discontinuous reception, at least one handover parameter in response to the failure report, comprises at least one of: ignoring a failure report where discontinuous reception played a part in the corresponding failure, using a weight for the importance of the failure report where discontinuous reception played a part in the corresponding failure and filtering failure reports where discontinuous reception played a part in the corresponding failure.

8. The method according to claim 7, wherein the at least one handover parameter comprises a time to trigger, TTT, parameter.

\* \* \* \* \*